US009302667B2

(12) United States Patent
Tassinger et al.

(10) Patent No.: US 9,302,667 B2
(45) Date of Patent: Apr. 5, 2016

(54) DEVICE AND METHOD FOR CONTROLLING A MOTOR VEHICLE DRIVE TRAIN

(71) Applicant: Bayerische Motoren Werke Aktiengesellschaft, Munich (DE)

(72) Inventors: Ingo Tassinger, Gersthofen (DE); Tobias Soller, Ismaning (DE); Markus Nell, Munich (DE); Stefan Thum, Planegg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 127 days.

(21) Appl. No.: 14/286,210

(22) Filed: May 23, 2014

(65) Prior Publication Data

US 2014/0274560 A1 Sep. 18, 2014

Related U.S. Application Data

(63) Continuation of application No. PCT/EP2012/073081, filed on Nov. 20, 2012.

(30) Foreign Application Priority Data

Nov. 24, 2011 (DE) ......................... 10 2011 087 016

(51) Int. Cl.
*B60W 10/04* (2006.01)
*B60W 10/11* (2012.01)
(Continued)

(52) U.S. Cl.
CPC ............... *B60W 10/18* (2013.01); *B60W 10/04* (2013.01); *F16H 61/20* (2013.01); *B60W 2510/18* (2013.01); *F16H 2059/366* (2013.01); *F16H 2061/202* (2013.01); *F16H 2312/06* (2013.01); *Y10T 477/646* (2015.01)

(58) Field of Classification Search
None
See application file for complete search history.

(56) References Cited

U.S. PATENT DOCUMENTS 5,119,694 A 6/1992 Sato et al.
2003/0075378 A1* 4/2003 Sprinkle ................ F16H 61/46 180/321

(Continued)

FOREIGN PATENT DOCUMENTS

CN 102209657 A 10/2011
DE 41 18 474 A1 1/1992

(Continued)

OTHER PUBLICATIONS

Chinese Office Action dated Apr. 16, 2015, with English translation (Eight (8) pages).

(Continued)

*Primary Examiner* — Edwin A Young
(74) *Attorney, Agent, or Firm* — Crowell & Moring LLP

(57) ABSTRACT

A method and arrangement is provided for controlling a motor vehicle drive train equipped with at least one drive motor, a torque converter, an automatic transmission and at least one electronic drive control device. In the drive control device, a function module is implemented for carrying out a creep control. This creep control can be activated independently of a brake actuation, when the actual rotational speed of the driving motor is greater than a defined desired rotational speed of the driving motor, and when the actual rotational speed of the driving motor cannot be reduced because of at least one defined condition as the minimally possible rotational speed of the driving motor.

10 Claims, 1 Drawing Sheet

(51) Int. Cl.

| | |
|---|---|
| ***B60W 10/18*** | (2012.01) |
| ***F16H 61/20*** | (2006.01) |
| *F16H 59/36* | (2006.01) |

(56) References Cited

U.S. PATENT DOCUMENTS

| | | | | |
|---|---|---|---|---|
| 2003/0130088 | A1 | 7/2003 | Schiele | |
| 2003/0205930 | A1* | 11/2003 | Smart | B60K 6/48 303/20 |
| 2004/0215385 | A1* | 10/2004 | Aizawa | B60K 31/00 701/93 |
| 2005/0021208 | A1* | 1/2005 | Nagai | F16H 61/20 701/54 |
| 2005/0187069 | A1 | 8/2005 | Mori et al. | |
| 2009/0305847 | A1 | 12/2009 | Klump et al. | |
| 2010/0282561 | A1* | 11/2010 | Rinck | F16H 61/688 192/48.3 |
| 2011/0218699 | A1 | 9/2011 | Petzold | |

FOREIGN PATENT DOCUMENTS

| | | | |
|---|---|---|---|
| DE | 43 04 153 | A1 | 8/1993 |
| DE | 44 46 077 | C2 | 10/2003 |
| DE | 103 02 172 | A1 | 7/2004 |
| DE | 10 2009 023 078 | A1 | 12/2009 |
| DE | 10 2009 001 799 | A1 | 9/2010 |
| DE | 10 2009 030 605 | A1 | 1/2011 |
| FR | 2 877 706 | A1 | 5/2006 |
| WO | WO 01/86176 | A1 | 11/2001 |

OTHER PUBLICATIONS

International Search Report (PCT/ISA/210) dated Jan. 24, 2013, with English translation (Seven (7) pages).

German Search Report dated Feb. 27, 2012, with English translation (Ten (10) pages).

* cited by examiner

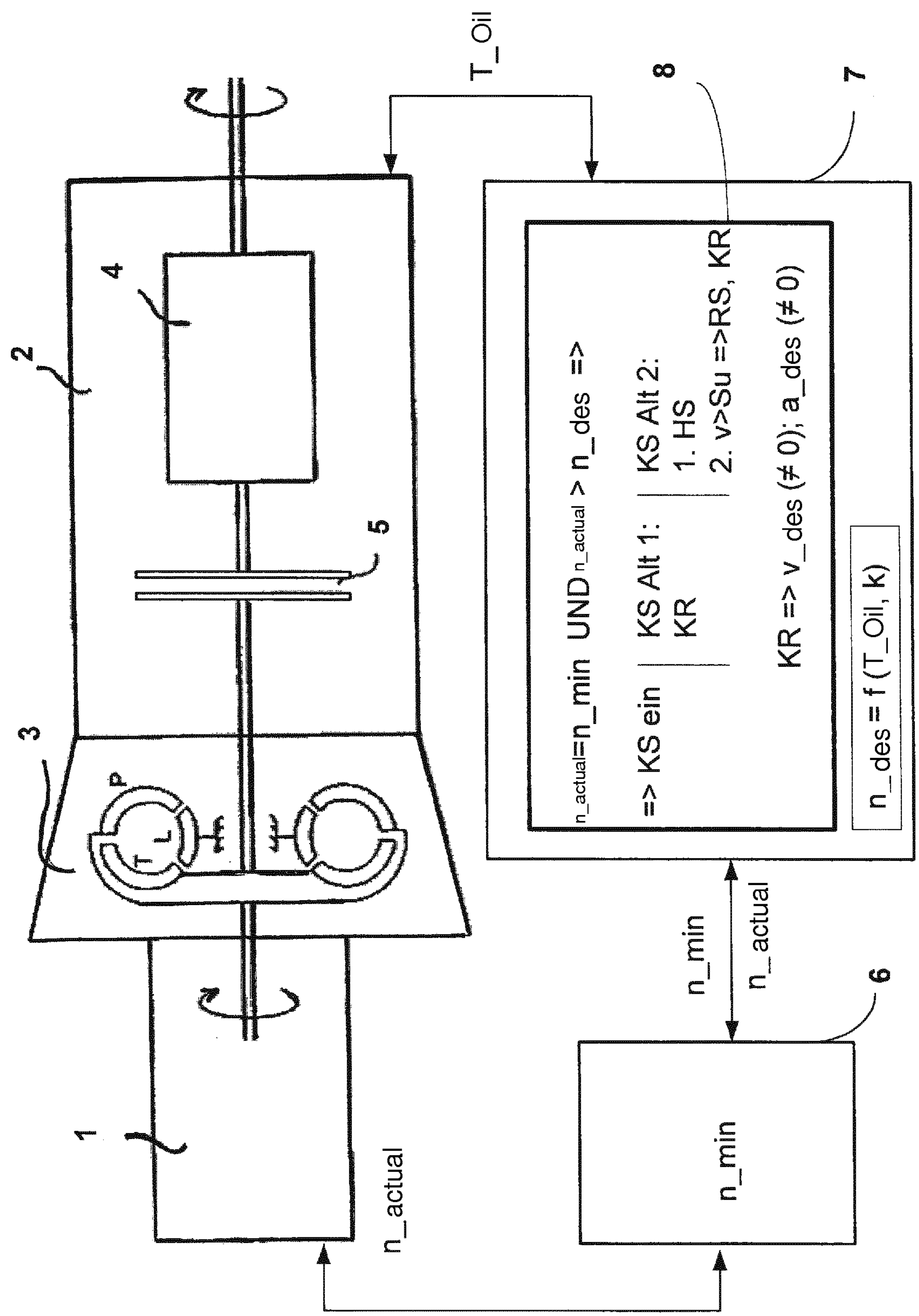
T_Oil
8
7
2
4
5
3
P
T
L
1
n_actual=n_min UND n_actual > n_des =>
=> KS ein
KS Alt 1:
KR
KS Alt 2:
1. HS
2. v>Su =>RS, KR
KR => v_des (≠ 0); a_des (≠ 0)
n_des = f (T_Oil, k)
n_min
n_actual
6
n_min
n_actual

DEVICE AND METHOD FOR CONTROLLING A MOTOR VEHICLE DRIVE TRAIN

CROSS REFERENCE TO RELATED APPLICATIONS

This application is a continuation of PCT International Application No. PCT/EP2012/073081, filed Nov. 20, 2012, which claims priority under 35 U.S.C. §119 from German Patent Application No. 10 2011 087 016.4, filed Nov. 24, 2011, the entire disclosures of which are herein expressly incorporated by reference.

BACKGROUND AND SUMMARY OF THE INVENTION

The invention relates to an arrangement and method for controlling a motor vehicle drive train in motor vehicles having an automatic transmission.

Such an arrangement is known in connection with a creep reduction, for example, from German Patent Document DE 10 2009 030 605 A1. According to this prior art, a function for the creep reduction is prohibited when the transmission control device recognizes the presence of a defined condition which makes it possible to infer that the driver has the intention to start driving dynamically.

A basic method for creep reduction is known, for example, from German Patent Document DE 44 46077 C2. This method relates particularly to automatic transmissions which are connected with the internal-combustion engine of the vehicle by way of a torque converter. The torque converter has an engine-side pump and a transmission-side turbine. The pump is coupled with the internal-combustion engine such that its rotational speed corresponds to the rotational speed of the internal-combustion engine. When the motor vehicle is stationary, the pump therefore drives the transmission-side turbine at a rotational speed corresponding to the idling rotational speed of the internal-combustion engine such that, without any creep reduction function, a so-called creep torque, which, among other things, is dependent on the rotational speed ratio of the rotational turbine speed to the rotational pump speed, on the transmission oil temperature, on the converter geometry and on the overall ratio, would occur at the output of the internal-combustion engine. With a creep reduction function, basically a creep (even though reduced) may also occur depending on the tractive resistance or rolling resistance and the extent of the creep reduction.

According to the creep reduction function known from German Patent Document DE 44 46077 C2, when the brake system of the vehicle is actuated, a value is detected which is proportional to the brake pressure. The creep reduction is controlled as a function of this detected value. In the case of the method known from DE 44 46077 C2, it is not only determined for controlling the creep reduction whether, but also how, extensively the vehicle brake system is actuated. An oscillating switching-on and off of the creep reduction can thereby be prevented when the vehicle brake system is actuated intermittently only at a low pressure, from which it can be inferred that specifically a creeping of the motor vehicle is desired, for example, in a traffic jam. However, when a considerable brake pressure is detected, preferably within a specific time window, the driver's intention of actually stopping the motor vehicle will be recognized and this wish is met by switching on the creep reduction.

The creep reduction or creep prevention is implemented, for example, by upshifting operations starting from a momentarily preselected gear, or by reducing the pressure in the clutch (starting gear) responsible for the momemtarily preselected gear.

The known prior art mainly concerns the emission reduction when the vehicle is stationary.

It is an object of the invention to improve a control of a motor vehicle drive train, particularly at a low driving speed, with a view to increasing comfort and the reproducibility for different transmission oil temperatures and for different idling rotational speeds of the internal-combustion engine.

This and other objects are achieved according to the invention by an arrangement and method for controlling a motor vehicle drive train consisting of at least one driving motor, a torque converter and an automatic transmission. The driving motor and the automatic transmission, including the torque converter, are controlled or automatically controlled by at least one electronic drive control device. For example, a first drive control device in the form of an electronic motor control device may be provided for the control of the driving motor and a second drive control device in the form of an electronic transmission control device may be provided for the control of the automatic transmission. However, a central drive control device may also be provided in which all control functions concerning the control of drive torques are combined, for example, in the form of a so-called torque structure. The invention can be used in vehicles having a single driving motor (such as an internal-combustion engine) as well as in hybrid vehicles having at least two driving motors (for example, an internal-combustion engine and an electric motor). According to the invention, a function module for implementing creep control is implemented in at least one drive control device.

This creep control is activated independently of a brake actuation when the actual rotational speed of the driving motor is greater than a defined desired rotational speed of the driving motor and when the actual rotational speed of the driving motor cannot be reduced as a result of at least one defined condition as a minimally possible rotational speed of the driving motor.

The invention is based on the following considerations. As a rule, automatic transmissions are equipped with a hydraulic torque converter as a start-up element. Among other things, the hydraulic power transmission of the converter is quadratically dependent on the differential motor-turbine rotational speed. As a function of the hydraulic power transmission, as well as of the converter excess, of the torque converter, the rotational motor speed and the overall ratio of the drive train, a defined creep torque is obtained, for example, for the creeping or maneuvering operation in drive position D or R.

In the case of engines with a higher idling rotational speed, such as 3-cylinder engines, a clearly increased creep torque occurs because of the quadratic dependence of the hydraulic power transmission on the differential rotational speed of the engine—turbine. This is felt by the driver by means of an unusually strong impulse of the vehicle to move forward or backward, which the driver can counter only by an increased brake pressure. Specifically, with respect to a maneuvering situation, this results in a clearly poorer proportioning capacity and in reduced comfort. Furthermore, in all situations involving increased idling rotational speed, such as a cold start, an activated air conditioner, an increased desire to charge the electric onboard power supply, or the like, there will again be an increased creep torque. It is a further disadvantage that vehicles with an automatic transmission and a torque converter cannot roll back, for example, on slight inclines, because of the constantly applied creep torque, without a changing of the drive position by the driver, thus, for example, from D to R. Vehicles with a start-up clutch, as a rule, are capable of rolling forward and backward on slopes solely by actuating the accelerator pedal.

A method is therefore provided according to the invention in order to automatically control the creep torque in the case of an automatic transmission having a torque converter. For this purpose, a frictionally engaged shifting element (at least a clutch or brake) in the transmission is to be operated or automatically controlled in a slip mode. The shifting element operated in the slip thereby determines the torque reaching the output and therefore the vehicle acceleration. The rotational slip speed in the shifting element is obtained from the resulting rotational speed ratio from the hydraulic power transmission at the torque converter.

Ideally, that shifting element can be used as the shifting element that is used for the so-called neutral idle control (NIC) function. The NIC function is a disengaging of the shifting element during a standstill or when coasting in order to increase the transmission efficiency by reducing the converter rotational slip speed and thereby the power loss. As a rule, the NIC function is exited by way of the reduction of the brake pressure by the driver.

As a result of the new function, the NIC shifting element exiting the NIC would directly change into the automatically controlled operation. For this purpose, the triggering or automatic controlling of the shifting element or the automatic adhesion control of the at least one clutch can take place as a function of various input parameters, such as the accelerator pedal, the engine torque, the rotational speed of the driving motor, the tractive resistance, the rotational output speed, the vehicle velocity, etc.

In an advantageous further development, a complete software module (function module) is provided, which coordinates all functions that are demanded from the shifting element to be disengaged, such as NIC; start-up support, MSA (=automatic motor start-stop system) and now, additionally, the automatic creep torque control or creep control.

The advantages can be combined as follows:

(a) Implementability of a low creep torque in the case of engines with a high idling rotational speed and automatic transmission with a hydraulic torque converter;

(b) Implementability of an arbitrary creep torque in the case of hybrid vehicles with one electrically driven axle and one axle driven by way of an automatic transmission by an internal-combustion engine;

(c) Implementability of an non-variable creep torque independently of temporary conditions with a higher idling rotational speed (for example, the air conditioner, warming-up, charging condition, particle filter regeneration, recuperation when stationary in the case of a hybrid, . . . )

(d) Permitting the "creep on demand" function as currently implemented in Applicant's series M3 vehicles with DKG;

(e) Improved proportioning capacity in the maneuvering, parking, and stop-and-go operation;

(f) Creaking noises when stopping the vehicle by way of the brake can be minimized; and (g) Implementability of a rolling-back function on slopes as a function of the accelerator pedal position.

Other objects, advantages and novel features of the present invention will become apparent from the following detailed description of one or more preferred embodiments when considered in conjunction with the accompanying drawings.

BRIEF DESCRIPTION OF THE DRAWING

The single FIGURE illustrates a drive arrangement for motor vehicles consisting of an internal-combustion engine as the driving motor, a torque converter and an automatic transmission with an automatic creep torque control or creep control.

DETAILED DESCRIPTION OF THE DRAWING

In the FIGURE, a driving motor 1, for example, an internal-combustion engine, is connected with an automatic transmission 2 by way of a torque converter 3. The pump P of the torque converter 3 is driven by the internal-combustion engine 1. When the internal-combustion engine 1 is switched on, oil flow is delivered by the pump P by way of the stator L of the torque converter 3 onto the buckets of the turbine T. The turbine T of the torque converter 3 is non-rotatably connected with the input train of the transmission 2. In a supplementary manner, block 4 schematically outlines further clutches and wheel sets of the transmission 2.

The internal-combustion engine 1 is basically controlled by an electronic engine control device 6 as the first drive control device. The automatic transmission 2 is basically controlled by an electronic transmission control device 7 as the second drive control device. However, as an alternative, only a single central drive control device may be present. In this embodiment, the transmission control device 7, as at least one drive control device according to the invention, receives input signals as, for example, the vehicle velocity v, the accelerator pedal position, the actual rotational speed n_actual of the driving motor 1 and the transmission oil temperature T_oil.

For engaging a momentarily preselected gear, the transmission control device 7 closes at least one clutch assigned to this gear; here, for example, the clutch 5 of a start-up gear (for example, $1^{st}$ gear, $2^{nd}$ gear, or reverse gear), in order to transmit the torque acting by way of the input train to the output train of the transmission 2. When the motor vehicle is at a standstill, the rotational speed of the output train is equal to zero. However, when, while the motor vehicle is standing still, the internal-combustion engine is running at an idling rotational speed (n_actual=n_LL), by way of the pump P of the torque converter 3, a torque transmission to the turbine T will take place which, however, when the motor vehicle is braked and the clutch 5 is closed, cannot be utilized for the drive of the motor vehicle. This power loss of the internal-combustion engine 1 leads to unnecessary fuel consumption.

In the case of known methods, for solving this problem, the clutch 5 is completely or almost completely opened during the standstill of the motor vehicle, so that no torque or only a minimal torque is transmitted to the output train of the transmission 2 (creep prevention or creep reduction). In particular, although a complete opening of the clutch 5 for the creep reduction or creep prevention results in an optimization of the fuel consumption reduction, it impairs the comfort during the switching-off of the creep reduction and during the transition to the start-up operation. The creep control according to the invention therefore does not necessarily only comprise a complete opening of the clutch 5.

The automatic creep torque control or creep control KS according to the invention is not provided for creep reduction when the vehicle is standing still, but rather on the contrary for the situation of the creeping approach and for a targeted creeping during the drive, particularly at a low driving velocity v.

However, basically, a creep reduction according to the state of the art can also be used when the vehicle velocity v is zero or when the brake pressure p caused by the driver is already greater than a first specified threshold.

However, the creep reduction (starting from an open clutch 5) according to the invention is changed to a targeted creep control independently of a brake actuation or a standstill of the motor vehicle when the actual rotational speed n_actual of the driving motor 1 is greater than as defined desired rotational speed n_desired of the driving motor 1, and the actual rotational speed n_actual of the driving motor 1 cannot be reduced because of at least one defined condition as the minimally possible rotational speed n_min.

Parameters, by which a reducibility may be limited, particularly are acoustic conditions, prevention of a stalling of the engine, emission-reducing provisions and/or desired generator power for the sufficient charging of a battery. The minimally possible rotational speed n_min may therefore also be variable.

Starting from a complete frictional connection in the transmission, the desired rotational speed n_des of the driving motor 1 is determined as a function of the desired vehicle behavior, of the transmission oil temperature T_oil, and of the torque converter characteristic k. The desired rotational speed n_des may also be variable. The desired rotational speed n_des of the driving motor 1 can be determined quantitatively, for example, on the basis of empirical values or may be determined theoretically by the evaluation of measured parameters.

The transmission control device or drive control device 7 contains a function module 8, preferably in the form of an executable program for implementing the creep control KS. By means of the creep control KS, when starting up from a standstill or during the drive—not falling below the minimally possible rotational speed n_min of the driving motor 1—, the slip, here, at least of the clutch 5 responsible for the currently engaged gear in the automatic transmission 2 is automatically controlled such that, by way of the automatic frictional-connection control KR, a specified desired non-zero acceleration a_des value or desired non-zero velocity v_des is reached but not exceeded.

In a first alternative Alt 1 to the creep control KS according to the invention, the currently engaged gear is maintained and the corresponding automatic frictional-connection control KR is carried out at a clutch (here, clutch 5) of the actually engaged gear without any preceding up- or downshifting.

In a second alternative Alt 2 to the creep control KS according to the invention, in a first step, a frictionally connected upshifting HS takes place into a higher gear without an automatic frictional-connection control KR, and, in a second step, when a specified relatively low driving speed threshold v>Su (for example, 5 km/h) is exceeded, a downshifting RS is carried out. Subsequently, the clutch 5 responsible for the gear currently engaged in the second step is automatically slip-controlled for the automatic frictional connection control KR. The upshifting HS first leads to the output torque reduction while simultaneously protecting components, because no slip control is necessary at a higher ratio, and nevertheless, at the moment of the creep approach, a vehicle acceleration will start that is reduced with respect to the lower gear. The downshifting with the slip control is necessary in order to then nevertheless creep—in a proportioned manner. The automatic control according to the invention preferably does not take place on the basis of accelerations from desired-actual rotational speeds, but rather on the basis of a torque consideration based on a rotational speed and hardware characteristics. For use in hybrid vehicles, the torques generated or to be generated by the creep reduction are taken into account in the torque balance and are supplemented or reduced by electric motors in the drive.

As a result of this embodiment according to the invention, an automatic transmission with a creep control is created, particularly during a drive at low driving speeds (such as driving into or out of a parking space), by which comfort, protection of components, and emission reduction are equally optimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling a motor vehicle drive train equipped with at least one driving motor, a torque converter and an automatic transmission, the method comprising the acts of:

providing a creep control, via at least one electronic drive control device, for the motor vehicle drive train; and activating the creep control independently of a brake actuation, when:

(i) the actual rotational speed of the driving motor is greater than a defined desired rotational speed of the driving motor, and (ii) the actual rotational speed of the driving motor, as a minimum possible rotational speed of the driving motor, cannot be reduced due to at least one certain condition.

2. The method according to claim 1, further comprising the acts of:

during a start-up from a standstill or during a drive, not falling below the minimum possible rotational speed of the driving motor, automatically controlling a slip of at least one clutch of the transmission or a brake responsible for a currently engaged gear such that, via an automatic frictional-connection control, a specified, non-zero desired acceleration or a specified, non-zero desired velocity, is reached.

3. The method according to claim 1, further comprising the acts of:

performing the creep control in two steps:

(1) first, a frictionally connected upshifting into a higher gear is implementable without an automatic frictional-connection control, and (2) second, when a specified driving threshold is exceeded, a downshifting is implementable after which, subsequently, at least one clutch or brake responsible for the gear currently engaged in the second step is slip-controlled for the automatic frictional-connection control.

4. The method according to claim 1, wherein the desired rotational speed of the driving motor is determined starting from a complete frictional connection in the transmission as a function of a transmission oil temperature and a torque converter characteristic.

5. The method according to claim 1, wherein a presence of a non-reducible minimally possible rotational speed of the driving motor is determined as a function of at least one of acoustic conditions, engine stall prevention conditions, emission-reduction provision conditions, or desired generator power conditions.

6. A control arrangement for a motor vehicle drive train equipped with a drive motor, a torque converter and an automatic transmission, the control arrangement comprising:

at least one electronic drive control device having stored therein program code that implements a creep control for the motor vehicle drive train, wherein:

the creep control is activated independently of a brake actuation when an actual rotational speed of the drive motor is greater than a defined target rotational speed, and when the actual rotational speed, as a minimum possible rotational speed, cannot be reduced due to a defined condition.

7. The control arrangement according to claim 6, wherein: during a start-up from a standstill or during a drive, not falling below the minimum possible rotational speed of the driving motor, the electronic drive control device automatically controls a slip of at least one clutch of the transmission or a brake responsible for a currently engaged gear such that, via an automatic frictional-connection control, a specified, non-zero desired acceleration or a specified, non-zero desired velocity, is reached.

8. The control arrangement according to claim 7, wherein the electronic drive device performs the creep control in two steps:

(1) first, a frictionally connected upshifting into a higher gear is implementable without an automatic frictional-connection control, and (2) second, when a specified driving threshold is exceeded, a downshifting is implementable after which, subsequently, at least one clutch or brake responsible for the gear currently engaged in the second step is slip-controlled for the automatic frictional-connection control.

9. The control arrangement according to claim 8, wherein the desired rotational speed of the driving motor is determined starting from a complete frictional connection in the transmission as a function of a transmission oil temperature and a torque converter characteristic.

10. The control arrangement according to claim 9, wherein a presence of a non-reducible minimally possible rotational speed of the driving motor is determined as a function of at least one of acoustic conditions, engine stall prevention conditions, emission-reduction provision conditions, or desired generator power conditions.

* * * * *